(12) United States Patent
Lau

(10) Patent No.: US 6,669,018 B2
(45) Date of Patent: Dec. 30, 2003

(54) DISK SECURITY DEVICE

(75) Inventor: Kwok Din Lau, Chai Wan (HK)

(73) Assignee: Finest Industrial Co., Ltd., Chai Wan (HK)

( * ) Notice: Subject to any disclaimer, the term of this patent is extended or adjusted under 35 U.S.C. 154(b) by 146 days.

(21) Appl. No.: 10/045,634

(22) Filed: Oct. 26, 2001

(65) Prior Publication Data

US 2003/0080007 A1 May 1, 2003

(51) Int. Cl.[7] .............................................. B65D 85/57
(52) U.S. Cl. ................................... 206/308.2; 206/807
(58) Field of Search ................... D9/439–441; 70/57.1, 70/63; 206/1.5, 308.1, 308.2, 387.11, 807; 215/320; 220/375; 411/182, 437, 508, 913

(56) References Cited

U.S. PATENT DOCUMENTS

| | | | |
|---|---|---|---|
| 3,438,529 A | * | 4/1969 | Lohrer ........................ 215/320 |
| 4,106,664 A | * | 8/1978 | Renk et al. ................. 220/375 |
| 4,208,944 A | | 6/1980 | Moryl |
| D256,721 S | * | 9/1980 | Boller et al. ................. D9/439 |
| 4,770,582 A | | 9/1988 | Junemann et al. |
| 5,320,240 A | * | 6/1994 | Wehle et al. ................ 220/375 |
| 5,377,825 A | | 1/1995 | Sykes et al. |
| 5,578,491 A | * | 11/1996 | Kayal et al. ................. 215/320 |
| 5,944,181 A | | 8/1999 | Lau |
| 6,145,688 A | * | 11/2000 | Smith ......................... 220/375 |
| 6,237,763 B1 | | 5/2001 | Lau |
| 6,283,280 B1 | | 9/2001 | Wong et al. |

* cited by examiner

*Primary Examiner*—Jim Foster
(74) *Attorney, Agent, or Firm*—Sheldon & Mak; Stephen R. Seccombe

(57) ABSTRACT

A security device for preventing theft of a disk such as a CD or DVD from a storage container having a base and a hinged lid, a pedestal including a button having retainers thereon that retract when the button is depressed for releasing the disk, and a wrapper holding the container closed. The device has a cap member and rearwardly extending flange and stem members. Release of the disk from the pedestal and removal of the disk through a slit made in the wrapper is blocked by the cap member preventing depression of the button, the flange member also positively holding the disk on the pedestal when the lid is deformed against the device. Preferably the device is releasably retained in a seated condition when the lid of the container is open. Also disclosed is a method for securing a disk container.

29 Claims, 3 Drawing Sheets

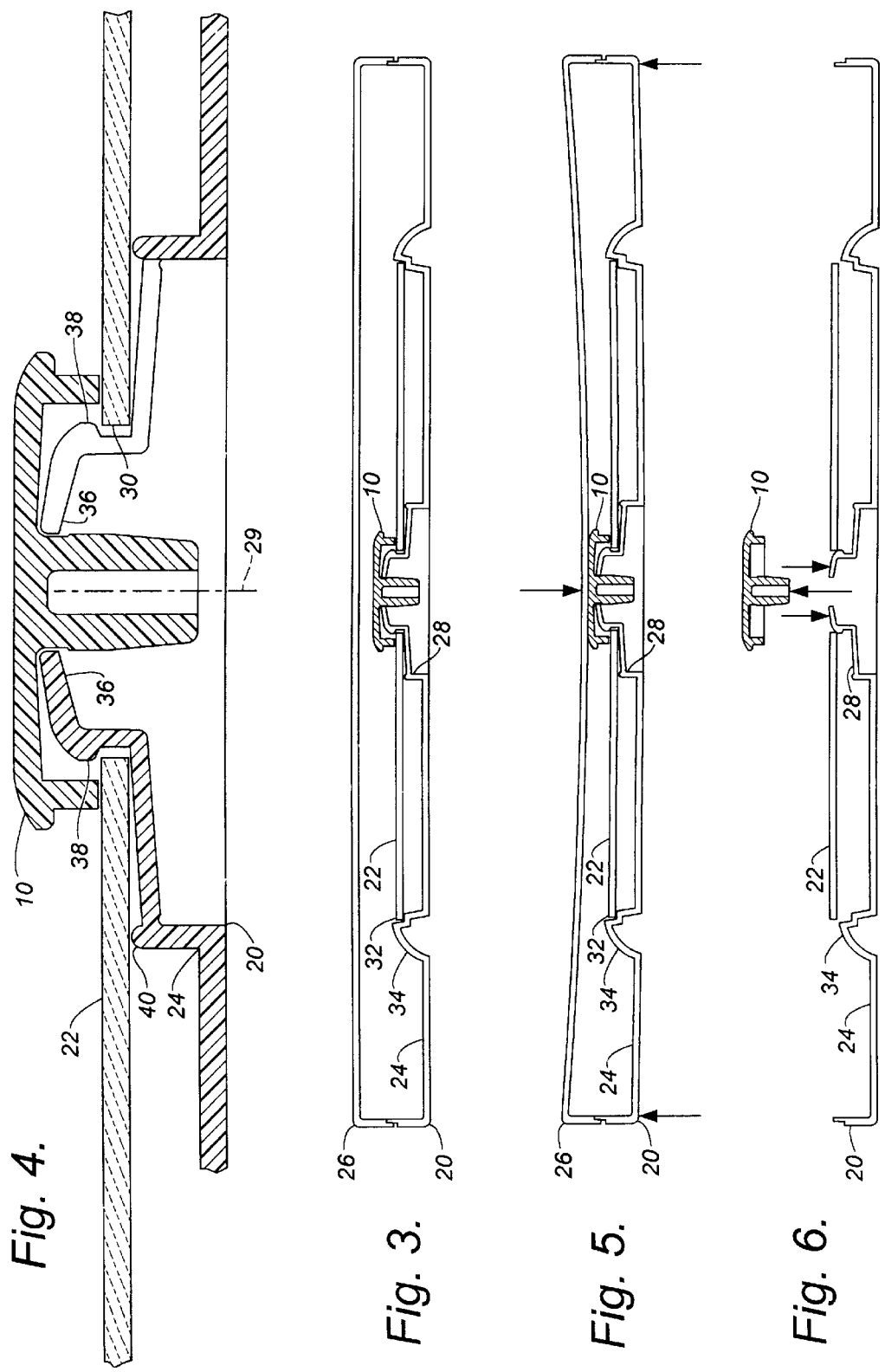

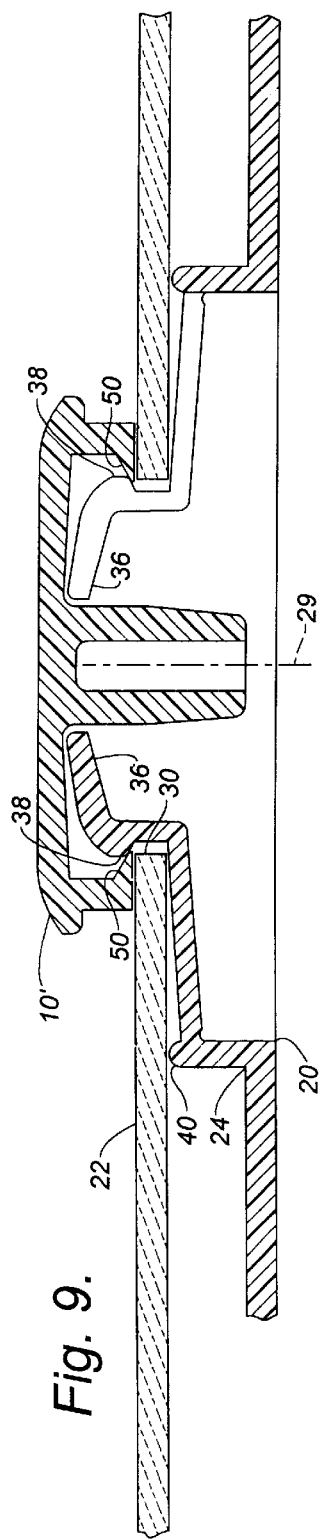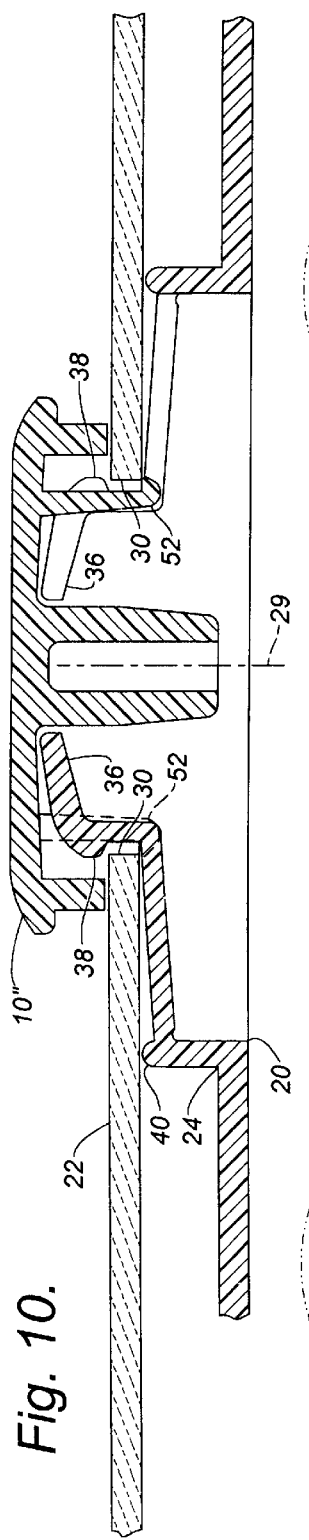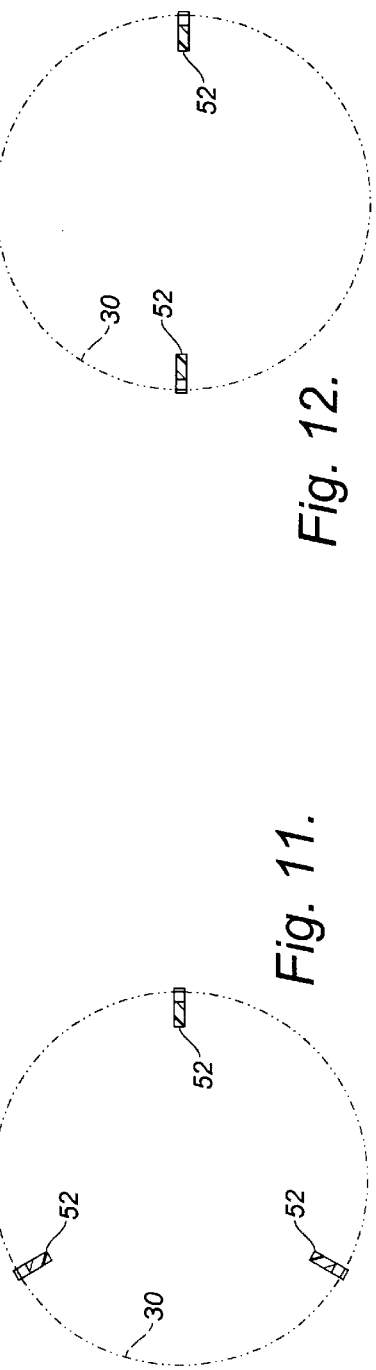

DISK SECURITY DEVICE

BACKGROUND

The present invention relates to the packaging of optical data disks such as compact disks (CDs) and video disks (DVDs) that have central circular locating openings, and more particularly to cases for protectively enclosing such disks for storage of same.

Protective containers for CDs and DVDs in common use have a central pedestal for supportively gripping the disc by engaging the central opening without contacting either side of the disk within data-containing regions thereof. Such containers typically have a ledge for contacting portions of an outer perimeter of the disk for stabilizing the disk against tipping on the pedestal. The disk is loaded into the container by lowering it onto the pedestal while gripping opposite perimeter portions, engagement with the pedestal being typically effected by simultaneous finger pressure against the disk proximate the central opening. Removal of the disk is similarly effected by finger pressure against the pedestal and simultaneous lifting at the perimeter portions. See, for example, the present inventor's U.S. Pat. No. 6,237,763, which is incorporated herein by this reference. Cases such as those described are typically marketed with wrappers that normally prevent opening without removal of the wrapper (which is not supposed to happen until purchase transactions are completed).

It has recently been discovered that it is possible for a shoplifter to make a slit along the side of the wrapper, then deform the case in a manner that causes release of the disk from the pedestal, then, by prying the case slightly open, sliding the disk out of the case.

Thus there is a need for a way to prevent theft of disks from such containers in the manner described, and that is easy to use and inexpensive to provide.

SUMMARY

The present invention meets this need by providing a security device that effectively locks CDs and DVDs in storage cases thereof until such cases are substantially opened. These cases are of the type having a base portion and an openable lid portion, a central pedestal projecting forwardly from the base on a pedestal axis, the pedestal including a segmented central button portion having a plurality of radially outwardly projecting retainer members being resiliently supported by in relation to the base. The disk is retained by engagement of the retainer members of the button segments with a front face of the disk proximate a central opening of the disk, applied pressure against the button segments retracting the retainer members to permit passage through the central opening of the disk for removal of same. In one aspect of the invention, the security device includes a cap member that is formed for covering the button segments, a flange member for contacting the disk on opposite sides of the button segments and spacing the cap member in front of the button, and a stem member that projects between the button segments for guiding the device into a seated condition. The cap member in combination with the flange member blocks depression of the button segments that otherwise might occur in response to rearward deflection of a central region of the lid portion. The stem member can be integrally formed with the cap member, and the flange member can be integrally formed with the cap member.

The flange member is preferably formed for clearing a button diameter of up to approximately 17 mm, and the flange member preferably projects rearwardly not less than approximately 3 mm from a central region of the cap member. Also, the flange member is preferably formed for contacting the disk within an outside diameter of not more than approximately 20 mm for protecting inner regions of the disk that may have future uses. The flange member can have an inside diameter of approximately 17 mm and an outside diameter of approximately 19.5 mm.

Preferably the cap member projects outwardly from the flange member for facilitating removal of the security device. The cap member can have an outside diameter of between approximately 20.5 mm and approximately 23 mm.

Preferably the stem member is adapted for blocking inward movement of the button segments when the device is seated; preferably the stem member tapers inwardly toward an end extremity thereof for facilitating insertion of the stem member between inward extremities of the button segments.

Preferably the device further includes a holder for releasably maintaining the seated condition of the device. The holder can include the stem member being formed having reduced cross-section proximate a root extremity thereof for releasable engagement by the segments of the button portion. Alternatively, the holder includes a flange hook member projecting inwardly from the flange member for engaging outwardly projecting retainer portions of the button segments. In another alternative, the holder includes a plurality of cap hook members projecting downwardly and outwardly from the cap member for engaging the disk in the seated condition of the device. The hook members can be an opposed pair of hook members for use with storage containers having an opposed pair of button segments, or an equally spaced trio of hook members for use with storage containers having three equally spaced button segments.

In another aspect of the invention, a method for securing a disk storage container against theft of a disk therefrom without removing a wrapper of the case includes:

(a) providing a security device having a cap portion, a flange portion rearwardly extending therefrom, and a stem portion projecting rearwardly from the cap member within the flange portion;

(b) with the case open and holding the disk seated on the pedestal, installing the security device by inserting the stem member between inward extremities of the button segments and lowering the device to bring the flange portion into proximity with the disk on opposite sides of the button segments;

(c) closing the container; and (d) applying a wrapper to the container to hold the container closed, thereby securing the container from theft by blocking depression of the button segments by the deflection of the lid portion and blocking inward movement of the segments of the button portion.

DRAWINGS

These and other features, aspects, and advantages of the present invention will become better understood with reference to the following description, appended claims, and accompanying drawings, where:

FIG. 3 is a longitudinal sectional view showing the device of FIG. 1 as installed in a case containing a disk;

FIG. 4 is a fragmentary sectional detail view within region 4 of FIG. 3;

FIG. 5 is a sectional view as in FIG. 3, showing the case in a deformed condition wherein a lid portion thereof is contacting the security device;

FIG. 6 is a sectional view as in FIG. 3, showing the case in an open condition;

FIG. 9 is a sectional detail view as in FIG. 4, showing another alternative configuration of the security device having inwardly projecting flange hook members;

FIG. 10 is a sectional view as in FIG. 4, showing a further alternative configuration of the security device having outwardly projecting cap hook members;

FIG. 11 is a plan sectional diagram view showing an equally spaced trio of the cap hook members for use with a case having three button segments; and FIG. 12 is a diagram view as in FIG. 11, showing an opposed pair of the cap hook members for use with a case having two button segments.

DESCRIPTION

Figure 8:
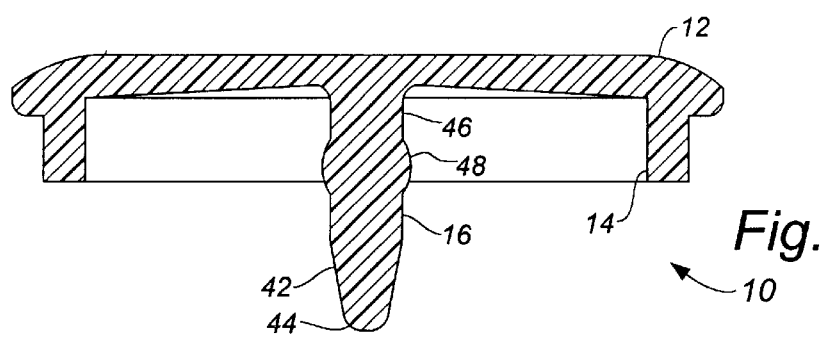
FIG. 8 is a sectional view showing another alternative configuration of the security device.
Figure 1:
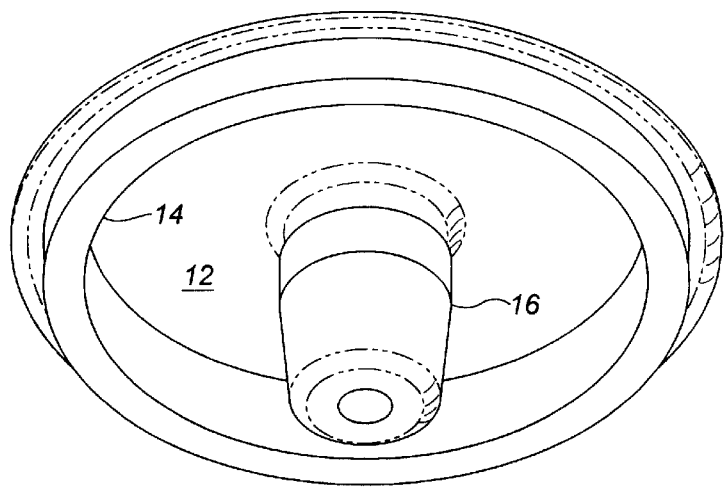
FIG. 1 is a bottom oblique perspective view of a security device for a protective disk container according to the present invention.
Figure 2:
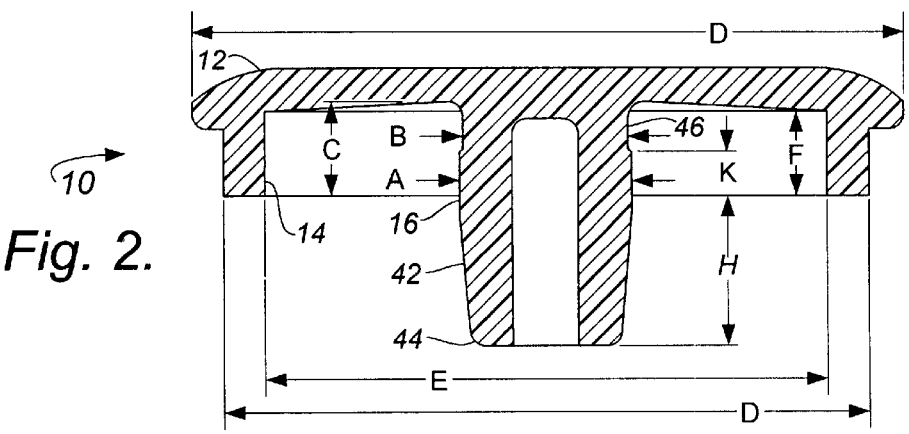
FIG. 2 is a lateral sectional view of the device of FIG. 1.

The present invention is directed to a security device that is particularly effective for preventing theft of disks such as CDs and DVDs from containers typically used in the marketing and storage of such disks. As indicated above, shoplifters are known to have made slits in side portions of disk case wrappers, succeeding in withdrawing disks from the cases while substantially closed by deforming the case in a manner that causes release of the disk from retaining pedestals of the cases, and then prying the case slightly open in the region of the slit. With reference to FIGS. 1–6 of the drawings, a security device 10 according to the present invention includes a cap member 12, a flange member projecting rearwardly from the cap member, and a centrally located stem member 16 for engagement within a disk case 20 to prevent theft of a stored disk 22 therefrom.

Typically, the disk case 20 is configured for conventional disks having an outside diameter of 120 mm, an inside diameter of 15 mm, and a thickness of between 1.2 mm and 1.3 mm. The disk case 20 includes a base portion 24, and a hinged lid portion 26, a pedestal 28 of the case projecting forwardly from the base 24 on a pedestal axis 29 for supportively engaging the disk 22 at a circular central opening 30 thereof. The disk 22 also has a periphery 32 that is supported and/or stabilized by a forwardly projecting edge-support portion 34 of the base portion 24. The case is normally provided in stores with a wrapper of sheet material (not shown) that is sealed for preventing opening of the case prior to purchase thereof.

The pedestal 28 is formed with a plurality of inwardly cantilevered button segments 36 for engaging the central opening 30 of the disk, the button segments having retainer portions 38 outwardly projecting therefrom for releasably retaining the disk 30 proximate a ring structure 40 that forms an outer portion of the pedestal 28. The retainer portions 38 typically inscribing a diameter of from 16 mm to approximately 17 mm when the disk 22 is retained thereby. The cantilevered support of the button segments 36 is sufficiently flexible for movement between a relaxed position shown in FIGS. 3–6 wherein the disk is confined between the retainer portions 38 and the ring structure 41 as shown in FIGS. 3–5, or wherein the disk 22 can rest on the button portions 36 as shown in FIG. 6, and a depressed position (not shown) wherein the retainer portions 36 are displaced axially rearwardly and radially inwardly for clearing the central opening 30 of the disk 22 as described in the above-referenced U.S. Pat. No. 6,237,763. As described above, an emergent problem is theft of disks, accomplished by slitting the wrapper, deforming the case to dislodge the disk from the pedestal, and slipping the disk out through the slit with the case pried slightly open in the region of the slit.

As best shown in FIG. 4, the security device 10 is installed with the stem member 16 projecting between inward extremities to the button segments 36, the cap member 12 covering the button segments 36 and the flange member 14 extending to proximate the disk 22. In an exemplary configuration shown best shown in FIGS. 1, 2, and 4, the stem member 16 is generally circular, having a tapered portion 42 that extends toward a rounded end extremity 44 of the stem member, and a neck portion 46 that extends a short distance from the cap member 12. As shown in FIG. 4, the security device 10 is preferably releasably retained in place by button segments in the relaxed positions thereof extending within an outside stem diameter A of the stem member as permitted by a reduced outside neck diameter B of the neck portion 46, the device 10 being dimensioned in FIG. 2. Other dimensions of the device are an outside cap diameter C of the cap member 12, respective flange outside and inside diameters D and E of the flange member 14, an axial flange length F of the flange member 14 from an adjacent inside portion of the cap member 12, an axial flange depth G from a central portion of the cap member 12 adjacent the stem member 12 relative to a rear extremity of the flange member 14, an axial stem projection H of the stem member 16 rearwardly of the flange member 14, and an axial neck distance K to which the neck portion 46 extends within the rear extremity of the flange member 14.

The diameter A of the stem member 16 is preferably selected according to particular disk cases 20 to be protected thereby, for a slight but not excessive interference fit. Thus the diameter A of the stem member 16 is preferably slightly larger (by approximately 0.25 mm) than that which would just touch the inward extremities of the button segments 36 in the relaxed positions thereof (or in positions occupied when the disk 22 is retained by the button segments when those are not the relaxed positions). In the exemplary configuration of FIGS. 1–6, the diameter A is approximately 5 mm. The neck diameter B is preferably smaller than that which would contact the button member extremities in the relaxed positions thereof. Thus the neck diameter B is typically from approximately 0.2 mm to approximately 0.5 mm smaller than the stem diameter A. It will be understood that the security device 10 is also effective with a clearance fit of the stem diameter A within the inner extremities of the button segments 36; however, the preferred interference fit advantageously prevents the device 10 from becoming accidentally dislodged from engagement of the seem member 16 with the button segments 36 of the case 20 during normal handling thereof when the lid portion 26 thereof is open.

With particular reference to FIGS. 3–6, attempted theft of a disk from a case 20 in the above-described manner is blocked when the case has the security device 10 installed according to the present invention. FIG. 3 shows a normal condition of the disk case 20 with the disk 22 stored therein, and the security device 10 in place with the stem member 16 engaging the button segments 36. FIG. 5 shows the disk case 20 being subjected to deformation such as would lead to the lid portion depressing the button segments 36 to release the disk, by force centrally applied to the lid portion 26 as indicated by a downwardly directed arrow, and opposite forces applied to edges of the base portion 24 as indicated by upwardly directed arrows. However, the security device 10 blocks downward deflection of the lid portion before the lid portion would reach the button segments, the device 10 providing clearance for the button segments while being supported by contact of the flange member 14 with the disk 22. FIG. 6 shows the disk case 20 having been opened, with removal of the security device 10 as indicated by the upwardly directed arrow, and the disk 22 resting on the button segments 36 following depression thereof as indicated by the downwardly directed arrows.

A suitable material for the security device 10 is any substantially rigid plastic, a moldable material being preferred. Alternatively, the device 10 can be formed by any suitable means, such as machining.

Figure 7:
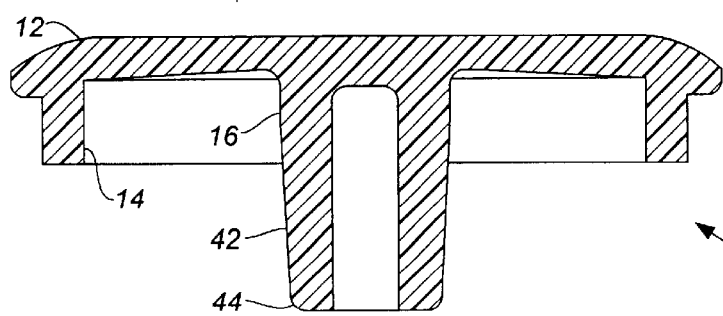
FIG. 7 is a sectional view as in FIG. 2, showing an alternative configuration of the security device of FIG. 1.

With further reference to FIG. 7, an alternative configuration of the security device 10 has the stem member 16 formed without a neck portion of reduced diameter. In this configuration, when there is a slight interference fit of the stem diameter A with the button segments 36, there would be no looseness of the device as installed in that the button segments would not assume their fully relaxed condition having clearance with the stem member 16. Thus a potential thief may be prevented from determining the presence of the security device 10 merely by shaking the disk case 20 for sensing a rattling of the device.

With further reference to FIG. 8, a further alternative configuration of the security device 10 has the stem member 16 formed with a bead-shaped enlargement 48, the portion of the stem member extending between the enlargement 48 and the cap member 14 forming a counterpart of the neck portion 46 in the configuration of FIGS. 1–4. Further, the configuration of FIG. 8 has the stem member 16 formed having a significantly reduced stem diameter A of approximately 2.3 mm. It will be understood that larger and smaller stem diameters are contemplated within the scope of the present invention, in any of the configurations of FIGS. 1–8.

Additional configurations of the security device, designated 10' and 10" respectively, are shown in FIGS. 9 and 10. The security devices 10' and 10" incorporate other means for releasably holding the device in place without relying on engagement with the inner extremities of the button segments 36. As shown in FIG. 9, the security device 10' has one or more flange hook members 50 that project inwardly from the flange member 14 for engaging underside portions of the retainer portions 38 of the button segments 36. The flange hook members 50 momentarily deflect the button segments inwardly a slight amount as the device 10' is being seated; and removal of the device 10' requires sufficient upward force to again slightly deflect the button segments inwardly. It will be understood that there can be a single flange hook member that completely or partially encircles the button segments 36, or an angularly spaced plurality of the flange hook members 50.

As shown in FIG. 10, a plurality of cap hook members 52 project downwardly between the button segments from the cap member 12, for engaging a bottom surface of the disk 22 proximate the central opening 30. The cap hook members 52 are configured for slight radial deflection during seating and removal of the device 10". FIG. 10 depicts the disk case 20 as having an odd number (typically three) of the button segments 36. Correspondingly, FIG. 11 shows three of the cap hook members 52 being equally spaced relative to the central opening 30 of the disk 22 for projecting between adjacent pairs of the button segments 36. FIG. 12 depicts an alternative arrangement of an oppositely disposed pair of the cap hook members 52 for use with a disk case 22 having an opposed pair of button segments 36.

Although the invention has been described in considerable detail with reference to certain preferred versions thereof, other versions are possible. For example, the stem member 16 can have cross-sectional shapes that are non-circular, such as polygonal, and star-shaped. Therefore, the spirit and scope of the appended claims should not necessarily be limited to the description of the preferred versions contained herein.

What is claimed is:

1. The combination of a disk storage container having a base portion and a lid portion, a forwardly projecting pedestal of the base portion including a button portion having spaced apart segments for retentatively engaging a central opening of the disk, segments of the button portion moving inwardly for releasing the disk upon depression of the button portion, with a security device, the security device comprising:

(a) a cap member for blocking contact between the lid portion and the button portion;
   (b) a flange member rearwardly extending from the cap member for contacting the disk on opposite sides of the button portion when the cap member is seated over the button portion; and
   (c) a stem member projecting rearwardly from the cap member within the flange portion for guiding the device into its seated condition.

2. The combination of claim 1, wherein the stem member is integrally formed with the cap member.

3. The combination of claim 2, wherein the flange member is integrally formed with the cap member.

4. The combination of claim 1, wherein the flange member is formed for clearing a button diameter of up to approximately 17 mm.

5. The combination of claim 4, wherein the flange member projects rearwardly not less than approximately 3 mm from a central region of the cap member.

6. The combination of claim 4, wherein the flange member is formed for contacting the disk within an outside diameter of not more than approximately 20 mm.

7. The combination of claim 6, wherein the flange member has an inside diameter of approximately 17 mm and an outside diameter of approximately 19.5 mm.

8. The combination of claim 7, wherein the cap member projects outwardly from the flange member for facilitating removal of the security device.

9. The combination of claim 8, wherein the cap member has an outside diameter of between approximately 20.5 mm and approximately 23 mm.

10. The combination of claim 1, wherein the stem member is adapted for blocking inward movement of the segments of the button portion when the device is in its seated condition.

11. The combination of claim 1, wherein the stem member tapers inwardly toward an end extremity thereof for facilitating insertion of the stem member between inward extremities of the button segments.

12. The combination of claim 8, wherein the cap member has an outside diameter of between approximately 20.5 mm and approximately 23 mm.

13. A security device for a disk storage container having a base portion and a lid portion, a forwardly projecting pedestal of the base portion including a button portion having spaced apart segments for retentatively engaging a central opening of the disk, segments of the button portion moving inwardly for releasing the disk upon depression of the button portion, the security device comprising:

(a) a cap member;
(b) a flange member rearwardly extending from the cap member for contacting the disk on opposite sides of the button portion when the cap member is seated over the button portion;
(c) a stem member projecting rearwardly from the cap member within the flange portion for guiding the device into its seated condition; and
(d) means for releasably holding the device in its seated condition.

14. The security device of claim 13, wherein the means for holding comprises the stem member having reduced cross-section proximate a root extremity thereof for engagement by the segments of the button portion.

15. The security device of claim 13, wherein the stem member tapers inwardly toward an end extremity thereof for facilitating insertion of the stem member between inward extremities of the button segments.

16. The security device of claim 13, wherein the means for holding comprises a flange hook member projecting inwardly from the flange member for engaging outwardly projecting retainer portions of the button segments.

17. The security device of claim 13, wherein the means for holding comprises a plurality of cap hook members projecting downwardly and outwardly from the cap member for engaging the disk in the seated condition of the device.

18. The security device of claim 17, wherein the hook members are an opposed pair of hook members for use with storage containers having an opposed pair of button segments.

19. The security device of claim 17, wherein the hook members are an equally spaced trio of hook members for use with storage containers having three equally spaced button segments.

20. The security device of claim 13, wherein the stem member is adapted for blocking inward movement of the segments of the button portion when the device is in its seated condition.

21. The security device of claim 13, wherein the means for holding comprises a flange hook member projecting inwardly from the flange member for engaging outwardly projecting retainer portions of the button segments for holding the device in its seated condition.

22. A security device for a disk storage container having a base portion and a lid portion, a forwardly projecting pedestal of the base portion including a button portion having spaced apart segments for retentatively engaging a central opening of the disk, segments of the button portion moving inwardly for releasing the disk upon depression of the button portion, the security device comprising:
(a) a cap member;
(b) a flange member integrally formed with the cap member and rearwardly extending therefrom not less than approximately 3 mm from a central region of the cap member for contacting the disk on opposite sides of the button portion within an outside diameter of not more than approximately 20 mm when the cap member is placed over the button portion, the flange member being formed for clearing a button diameter of up to approximately 17 mm;
(c) the cap member projecting outwardly from the flange member to an outside diameter of between approximately 20.5 mm and approximately 25 mm for facilitating removal of the security device; and
(d) a stem member integrally formed with the cap member and projecting rearwardly from the cap member within the flange portion for blocking inward movement of the segments of the button portion when the device is in place over the button portion, the stem member tapering inwardly toward an end extremity thereof for facilitating insertion of the stem member between inward extremities of the button segments.

23. The security device of claim 22, wherein the stem member is formed having reduced cross-section proximate a root extremity thereof for releasable retention of the security device by the segments of the button portion.

24. A method for securing a disk storage container against theft of a disk therefrom without removing a wrapper of the case, the container having a base portion and a lid portion, a forwardly projecting pedestal of the base portion including a button portion having spaced apart segments for retentatively engaging a central opening of the disk, segments of the button portion moving inwardly for releasing the disk upon depression of the button portion, the method comprising:
(a) providing a security device having a cap portion, a flange portion rearwardly extending therefrom, and a stem portion projecting rearwardly from the cap member within the flange portion;
(b) with the case open and holding the disk seated on the pedestal, installing the security device by inserting the stem member between inward extremities of the button segments and lowering the device to bring the flange portion into proximity with the disk on opposite sides of the button segments;
(c) closing the container; and
(d) applying a wrapper to the container to hold the container closed, thereby securing the container from theft by blocking depression of the button segments by the deflection of the lid portion and blocking inward movement of the segments of the button portion.

25. A security device for a disk storage container having a base portion and a lid portion, a forwardly projecting pedestal of the base portion including a button portion having spaced apart segments for retentatively engaging a central opening of the disk, segments of the button portion moving inwardly for releasing the disk upon depression of the button portion, the security device comprising:
(a) a cap member;
(b) a flange member rearwardly extending from the cap member for contacting the disk on opposite sides of the button portion when the cap member is seated over the button portion, the flange member having an inside diameter of approximately 17 mm and an outside diameter of approximately 19.5 mm for contacting the disk within an outside diameter of not more than approximately 20 mm; and
(c) a stem member projecting rearwardly from the cap member within the flange portion for guiding the device into its seated condition, the stem member tapering inwardly toward an end extremity thereof for facilitating insertion of the stem member between inward extremities of the button segments.

26. A security device for a disk storage container having a base portion and a lid portion, a forwardly projecting pedestal of the base portion including a button portion having spaced apart segments for retentatively engaging a central opening of the disk, segments of the button portion moving inwardly for releasing the disk upon depression of the button portion, the security device comprising:

(a) a cap member;
(b) a flange member rearwardly extending from the cap member for contacting the disk on opposite sides of the button portion when the cap member is seated over the button portion, the flange member having an inside diameter of approximately 17 mm and an outside diameter of approximately 19.5 mm for contacting the disk within an outside diameter of not more than approximately 20 mm; and
(c) a stem member projecting rearwardly from the cap member within the flange portion for guiding the device into its seated condition, the stem member having reduced cross-section proximate a root extremity thereof for engagement by the segments of the button portion for releasably holding the device in its seated condition.

27. A security device for a disk storage container having a base portion and a lid portion, a forwardly projecting pedestal of the base portion including a button portion having spaced apart segments for retentatively engaging a central opening of the disk, segments of the button portion moving inwardly for releasing the disk upon depression of the button portion, the security device comprising:

(a) a cap member;
(b) a flange member rearwardly extending from the cap member for contacting the disk on opposite sides of the button portion when the cap member is seated over the button portion;
(c) a stem member projecting rearwardly from the cap member within the flange portion for guiding the device into its seated condition; and
(d) a plurality of cap hook members projecting downwardly and outwardly from the cap member for engaging the disk in the seated condition of the device for releasably holding the device in its seated condition.

28. The security device of claim 27, wherein the hook members are an opposed pair of hook members for use with storage containers having an opposed pair of button segments.

29. The security device of claim 27, wherein hook members are an equally spaced trio of hook members for use with storage containers having three equally spaced button segments.

* * * * *